United States Patent
Antinori et al.

(10) Patent No.: US 11,915,063 B2
(45) Date of Patent: Feb. 27, 2024

(54) MANAGING A PRESENTATION MODE FOR APPLICATION PROGRAMMING INTERFACE FUNCTIONS

(71) Applicant: Red Hat, Inc., Raleigh, NC (US)

(72) Inventors: Paolo Antinori, Novara (IT); Eric Wittmann, Newtown, CT (US); Carles Arnal Castello, Valencia (ES)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/713,769

(22) Filed: Apr. 5, 2022

(65) Prior Publication Data
US 2023/0315542 A1    Oct. 5, 2023

(51) Int. Cl.
*G06F 3/00*     (2006.01)
*G06F 9/54*     (2006.01)
*G06F 16/955*   (2019.01)
*G06F 3/0484*   (2022.01)

(52) U.S. Cl.
CPC .............. *G06F 9/54* (2013.01); *G06F 3/0484* (2013.01); *G06F 16/9558* (2019.01)

(58) Field of Classification Search
CPC ...................................................... G06F 9/541
USPC ......................................................... 719/328
See application file for complete search history.

(56) References Cited

U.S. PATENT DOCUMENTS

| | | | |
|---|---|---|---|
| 7,761,591 B2 * | 7/2010 | Graham ................. | G06Q 40/02 709/227 |
| 9,778,924 B2 | 10/2017 | Batabyal et al. | |
| 9,823,950 B1 * | 11/2017 | Carrier ................... | G06F 9/543 |
| 9,886,247 B2 | 2/2018 | Laredo et al. | |
| 9,959,198 B1 | 5/2018 | Jha et al. | |
| 11,132,241 B2 | 9/2021 | Caldato et al. | |
| 11,381,663 B1 * | 7/2022 | Vega ..................... | H04L 67/125 |
| 11,467,887 B1 * | 10/2022 | Caudill .................... | G06F 9/54 |
| 2011/0099463 A1 * | 4/2011 | Abagyan ................. | G06T 19/00 715/202 |
| 2015/0012451 A1 * | 1/2015 | Rusev .................... | G06Q 40/00 705/319 |
| 2018/0125201 A1 * | 5/2018 | Nichols .................. | H04N 23/69 |

(Continued)

OTHER PUBLICATIONS

Luo Qi, A Universal Solution of an Embedded Multitasking GUI System. (Year: 2005).*

(Continued)

*Primary Examiner* — Lechi Truong
(74) *Attorney, Agent, or Firm* — LOWENSTEIN SANDLER LLP

(57) ABSTRACT

Systems and methods for providing a presentation mode for application programming interface functions. In one implementation, a first selection pertaining to one or more API functions of a plurality of API functions is received, via a user interface, wherein the first selection indicates an order of execution of the one or more API functions for a task. A second selection is received indicating a relationship between at least two of the API functions of the plurality of API functions. The relationship between the at least two API functions is set according to the second selection. The one or more API functions are caused, by the processing device, to be arranged according to the first selection. The one or more API functions are presented, via the user interface, arranged according to the first selection.

17 Claims, 5 Drawing Sheets

(56) References Cited

U.S. PATENT DOCUMENTS

2019/0182371 A1* 6/2019 Ashall ............... H04M 1/72469
2022/0050558 A1* 2/2022 Montgomery ........ G06F 3/0482

OTHER PUBLICATIONS

Mike McGavin, Visualisations of Execution Traces (VET): An Interactive Plugin-Based Visualisation Tool. (Year: 2006).*
IBM, "API Call Graph", 1 page https://www.ibm.com/docs/en/addi/5.0.5?topic=layouts-api-call-graph.
Red Hat, Inc., "An Introduction to Openapi Specification", 2021, 3 pages https://access.redhat.com/documentation/en-us/red_hat_3scale_api_management/2.10/html/providing_apis_in_the_developer_portal/an-introduction-to-openapi-specification_creating-a-new-service-based-on-oas.
"API Documentation", 2021, 4 pages https://swagger.io/solutions/api-documentation/.
EP Search Report for EP Application No. EP22183194, dated Dec. 13, 2022, 8 pages.
"Sequence Diagram Tutorial—Complete Guide with Examples", Sep. 24, 2021, 19 pages https://web.archive.org/web/20211022062026/https://creately.com/blog/diagrams/sequence-diagram-tutorial/.

* cited by examiner

MANAGING A PRESENTATION MODE FOR APPLICATION PROGRAMMING INTERFACE FUNCTIONS

TECHNICAL FIELD

The present disclosure is generally related to application programming interfaces, and more particularly, to managing a presentation mode for application programming interface functions.

BACKGROUND

An application programming interface (API) can be used to exchange data between two or more software applications. For example, an API of a software application installed on a computer system can exchange data with another computer system by transmitting a request to perform an API function. The request can identify the API functions to be performed and can optionally comprise one or more API parameters. API specifications are commonly used to simplify APIs by providing a document describing the various API functions, API parameters, comments describing the purpose and result of performing each API function, etc.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
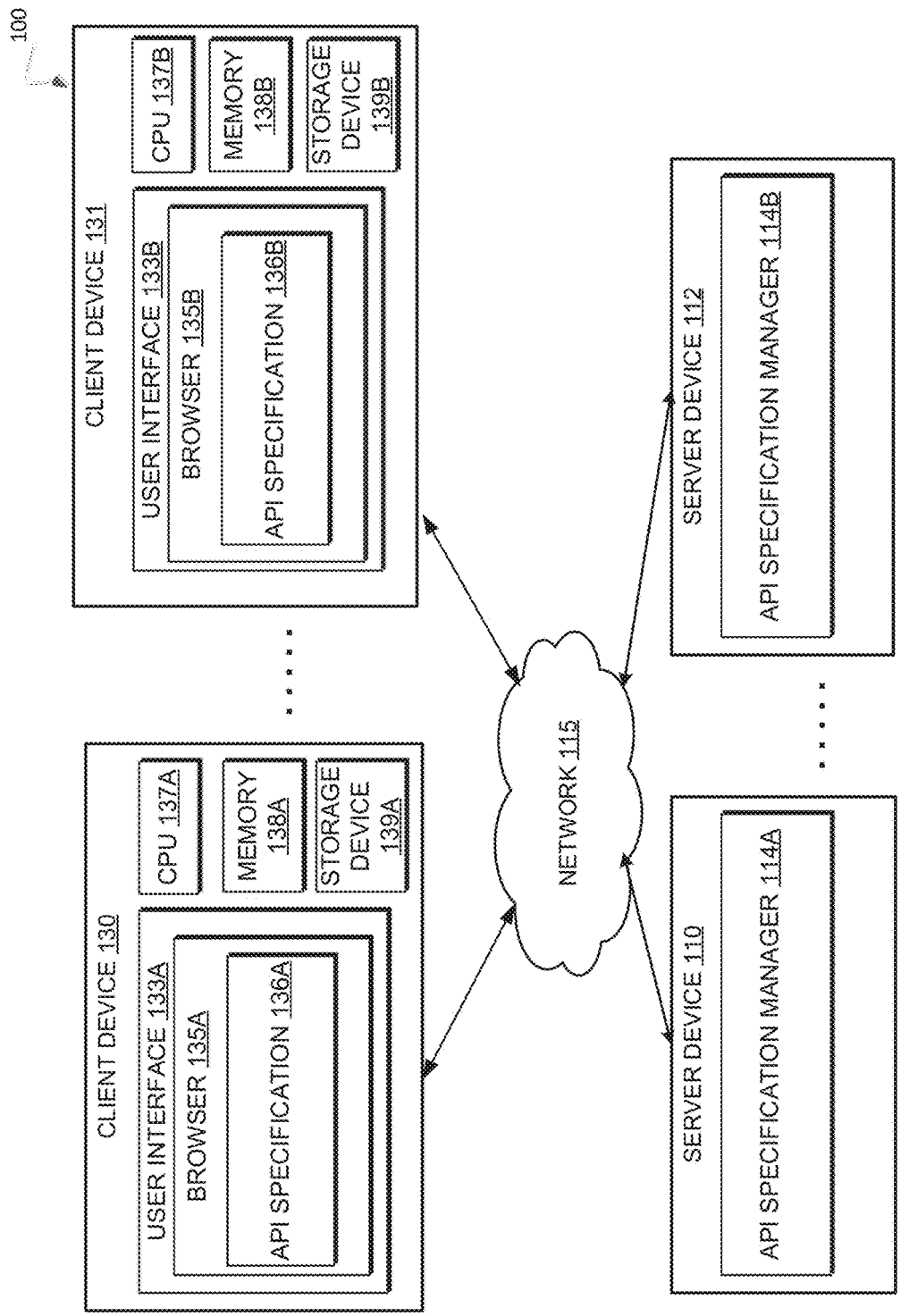
FIG. 1 depicts a block diagram of an example system architecture operating in accordance with one or more aspects of the present disclosure.

Implementations of the disclosure are directed to managing a presentation mode for application programming interface functions.

An application programming interface (API), which can be exposed by a software application, can include a set of API calls referencing various functions of the software application which other applications can invoke. An API call can identify the function to be invoked and can optionally specify one or more input or output parameters of the function, as well as the return value of the function.

An API specification of a software application can include formalized definitions of API resources and/or API functions, thus enabling another software application to interact with the software application exposing the API. An API resource can be defined as an object with a type and associated data. An API resource definition can include an API resource identifier, an API resource type, relationship data (e.g., relationship to other API resources and API functions, including references to one or more functions that operate on the resource), and any additional information to allow another software application to use an API resource to interact with the software application. An API function definition can include an API function identifier, relationship data (including references to the API resources), API input and/or output parameter definitions, and any additional information to allow another software application to use an API function to interact with the software application. An API function can be a sequence of program instructions that perform a particular operation. An API parameter definition can include an API input and/or output parameter, relationship data (e.g., relationship with an API function), and any additional information to allow another software application to use an API parameter to interact with the software application. An API parameter can be a value of the API function. In various illustrative examples, an API specification for a given software application can be generated by the software application itself, by another software application, or by a user.

API specifications may be used to simplify APIs by providing a document that describes all the relevant information for an API. However, API specifications do not capture information about APIs in an organized manner, such as a specific order in which to invoke a set of API functions in order to achieve a certain task or goal. Thus, a user (e.g., an engineer) who wants to describe the use of several APIs to achieve a certain business goal will need to navigate between the different sections of the API specification to find the pertinent API functions. Although certain API specifications may include links between the output of one API function and the input of a subsequent API function in a linear sequence, there are no links that specify a complete flow of API functions that are needed in order to achieve a task/goal.

Aspects of the present disclosure address the above noted and other deficiencies by providing a presentation mode for application programming interface functions. In some embodiments, a user can select a set of API functions that belong to a specific flow of operations (i.e., a specific flow of API functions required to perform a certain task), and the user can specify the order in which the API functions should be invoked in the specific flow. The user can also define relationships between the API functions, such as relationships between the output of one API functions and the input of a subsequent API functions. For example, the output of an API function A can be used as input of an API function B. In some examples, the outputs of two or more functions (e.g., API function A, API function B, etc.) can be used as input to an API function X. In some examples, the output of an API function A can be used as an input to one or more API functions (e.g., API function B, API function C, etc.) In some examples, the output of an API function A can be used as an input to an API function B, and the output of the API function B can be used as an input to an API function C, etc. In some examples, the output of an API function B can be used as an input of an API function A. In some examples, the output of an API function C and the output of an API function D can be used as inputs of an API function B. The user can additionally include comments that include relevant information, such as comments to help describe the specific flow of API functions. The information that the user specifies (e.g., the API functions, relationships, comments, etc.)

can be captured via a graphical user interface (GUI) (e.g., by a web application and/or web browser plug-in). The information can further be presented via a GUI using visual animations. The visual animations can sequentially display API functions of the set of API functions that are to be invoked in the specific flow, including the relationships and/or comments that a user has specified for each API functions. The user can also navigate to each API functions in the API specification(s) using hyperlinks that allow users to jump from one section to another.

Aspects of the present disclosure provide a presentation mode for application programming interface operations that allows users to capture information regarding a specific flow of API functions required to achieve a certain outcome (e.g., a business goal) and presents the information to users using visual animations that enable users to easily navigate the specific flow of API functions and keep track of pertinent information (e.g., relationships between the API functions, additional comments, etc.). Instead of navigating among various sections of an API specification at random order and needing to remember the pertinent information in order to achieve a certain outcome, users can be presented with the information in an organized manner. Further, instead of using links that only link to subsequent operations in a linear sequence such as in OpenAPI specifications, users can be presented with visual animations and links that define a complete set of steps required within the specific flow of API functions. Thus, the efficiency and effectiveness of using API specifications to achieve tasks/goals (e.g., business goals) can be improved.

FIG. 1 is a diagram of one embodiment of a system architecture for providing a presentation mode for application programming interface functions, in accordance with one or more aspects of the present disclosure. The distributed computer system 100 can include client devices 130, 131 and server devices 110, 112, communicably connected over a network 115. There may be any number of client devices 130, 131 and any number of server devices 110, 112. The network 115 can be a private network (e.g., a local area network (LAN), a wide area network (WAN), intranet, etc.) or a public network (e.g., the Internet).

The client devices 130, 131 and server devices 110, 112 can be a server, a workstation, a personal computer (PC), a mobile phone, a smart phone, a mobile computing device, a personal digital assistant (PDA), tablet, laptop computer, thin client, etc. The client devices 130, 131 can include one or more central processing units (CPUs) 137A-137B, memory 138A-138B, and storage devices 139A-139B (e.g., a data storage device or mass storage device, such as a magnetic or optical storage based disk, tape or hard drive). Client devices 130, 131 can also include one or more peripheral devices (not pictured), which can include network devices, graphics devices, system components (e.g., bridges, ports, buses) media devices, (e.g., video cards, sounds cards, etc.).

The client devices 130, 131 can each include a user interface 133A, 133B that can be a graphical user interface (GUI). The client devices 130, 131 can each include a browser 135A, 135B. Each browser 135A, 135B can be a web application browser. The browsers 135A, 135B can each host an API specification 136A, 136B. The API specification can include a definition of API resources, API functions, and API parameters. In one implementation, the definitions in the API specification can include the names and description for at least one of an API resource, API function, and API parameter. Parameters may also have defined data types, such as integer, Boolean, string, among others. In some embodiments of the present disclosure, a user can select a set of API functions listed on the API specification 136A and/or 136B via the browser 135A and/or 135B. In some embodiments of the present disclosure, a user can select a set of API functions listed on the API specification 136A and/or 136B via a web browser plug-in associated with the browser 135A and/or 135B (not pictured in FIG. 1). In some embodiments, the user can also arrange the set of API functions according to a specific arrangement, specify relationships between one or more API functions, and add additional comments to describe the specific arrangement via the browser 135A and/or 135B or via a web browser plug-in.

Server devices 110 and 112 can include API specification manager 114A and 114B, respectively. API specification manager 114A and/or 114B can be distributed across multiple server devices, as illustrated in FIG. 1. Alternatively, the API specification manager 114A and/or 114B may be installed on a single server device.

In some embodiments, the API specification manager 114A and/or 114B can present (e.g., display) the API specification 136A and/or 136B to a user on the user interface 133A and/or 133B via the browser 135A and/or 135B. In some embodiments, the API specification manager 114A and/or 114B can present one or more API specifications in an API repository document via the browser 135A and/or 135B. The API specification manager 114A and/or 114B can receive a selection (i.e., from a user) of one or more API functions that are to be invoked in a specific arrangement in order to perform a certain task or achieve a certain goal. The specific arrangement can include a particular order in which each of the one or more API functions is to be invoked. The API specification manager 114A and/or 114B can further arrange the one or more API functions according to the arrangement selected. The API specification manager 114A and/or 114B can cause the arrangement of the API functions to be presented, e.g., to a user, on the user interface 133A and/or 133B. In some embodiments, presenting the arrangement of the API functions on the user interface 133A and/or 133B can include generating visual animations to represent the arrangement, which users can use to navigate the API functions within the arrangement. In some embodiments, generating the visual animations can include generating hyperlinks that allow a user to navigate from one API function to another API function in consecutive order in accordance with the arrangement. For example, a user can select an arrangement of the API functions as follows: API function "1", API function "10", API function "5", API function "6". The arrangement specifies the order in which the API functions are to be invoked. Generating the visual animations to represent the particular arrangement can include generating hyperlinks that allow a user to navigate from API function "1" to API function "10" to API function "5" and to API function "6" in consecutive order. The hyperlinks can allow the user to navigate from one API function to another by including an embedded hyperlink representing each API function that the user can click on via the GUI in order to navigate from one API function to another API function. In some embodiments, generating the visual animations can include generating one or more GUI elements, such as buttons, images, icons, etc., that represent (e.g., logically and/or graphically) each API function. Each GUI element can be clickable by the user in order to allow the user to navigate from one API function to another API function according to the arrangement. Further details with regard to the API specification manager 114A, 114B are described herein below.

Figure 2:
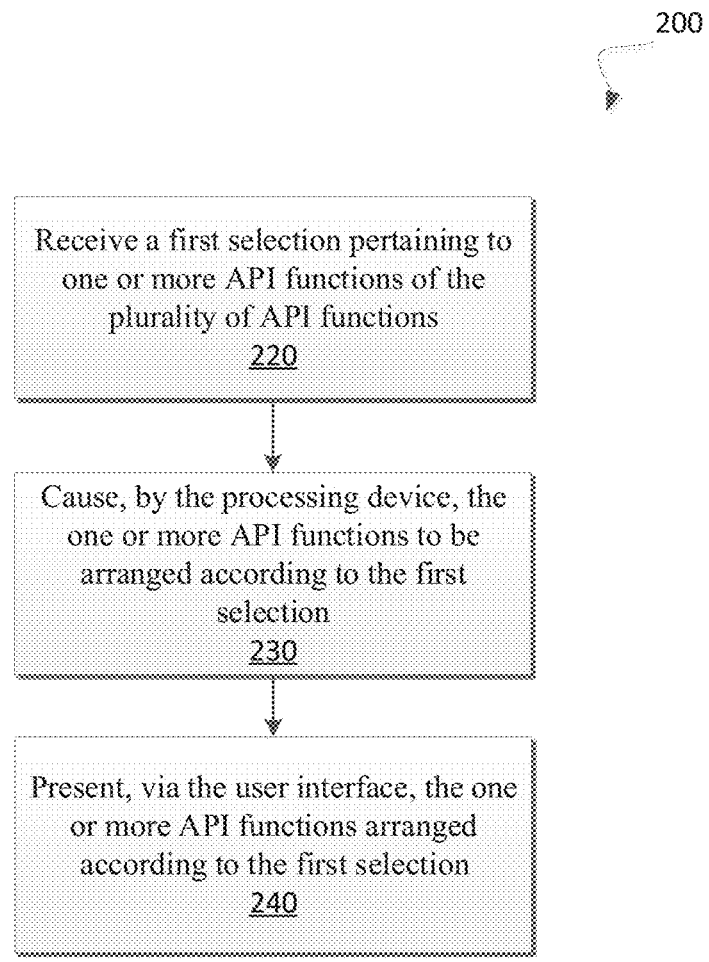
FIG. 2 is a flow diagram of a method for managing a presentation mode for application programming interface functions, in accordance with one or more aspects of the present disclosure.

FIG. 2 depicts a block diagram of a method 200 for providing a presentation mode for application programming interface functions, in accordance with one or more aspects of the present disclosure. Method 200 may be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations may be performed by one or more processors of a computer system (e.g., client devices 130, 131 and/or server devices 110, 112 of FIG. 1) implementing the method. In an illustrative example, method 200 may be performed by a single processing thread. Alternatively, method 200 may be performed by two or more processing threads, each thread implementing one or more individual functions, routines, subroutines, or operations of the method. In an illustrative example, the processing threads implementing method 200 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, at operation 220, the processing logic receives a selection pertaining to one or more API functions. Selecting the one or more API functions can include receiving a selection by a user interacting with a browser (e.g., the browser 135A and/or 135B of FIG. 1) or interacting with a web browser plug-in that is externally extended from the browser. The user can click, enter, or otherwise indicate each API function that the user desires to include, e.g., in a specific flow of API functions in order to perform a certain task and/or achieve a certain goal, as described herein above. For example, if there are API functions 1-5 listed consecutively (i.e., API functions 1, 2, 3, 4, 5) in an API specification, the user can select an order of the API functions to be API function 3, API function 2, API function 1, API function 4, and API function 5. In some embodiments, the one or more API functions can be selected from the set of API functions included in an API specification of one or more API specifications.

In some embodiments, the processing logic can present the one or more API specifications (e.g., the API specification 136A and/or 136B of FIG. 1) via the user interface (e.g., the user interface 133A and/or 133B of FIG. 1) of a client device (e.g., the client device 130 and/or 131 of FIG. 1). Each API specification can each reference a set of API functions. The one or more API specifications can also define each API functions being referenced. The one or more API specifications can also include one or more API resources, one or more input and/or output API parameters, etc., as described herein above. In some embodiments, the processing logic can present the one or more API specifi-cations via the user interface on a browser (e.g., the browser 135A and/or 135B of FIG. 1). In some embodiments, the processing logic can present the one or more API specifications in response to receiving a request from a user via the client device. In some embodiments, the processing logic can present an API specification repository that includes the one or more API specifications. The API specification repository can be a document that compiles the one or more API specifications within a single document. In some embodiments, each API specification can be an OpenAPI specification document. In some embodiments, responsive to presenting the one or more API operations, the processing logic can receive the selection pertaining to the one or more API functions as described herein at operation 220.

At operation 230, the processing logic causes, by the processing device, the one or more API functions to be arranged according to the selection received at operation 220. In some embodiments, causing the one or more API functions to be arranged according to the selection received can include ordering the one or more API functions in the order specified by the selection. For example, as described with respect to operation 220, the user can select the order of API functions to be API function 3, API function 2, API function 1, API function 4, and API function 5. The processing logic can arrange (i.e., order) the API functions according to the user's specified arrangement.

At operation 240, the processing logic presents the one or more API functions arranged according to the selection via the user interface. In some embodiments, presenting the one or more API functions arranged according to the selection includes generating one or more visual animations. The processing logic can present the one or more visual animations via the user interface. In some embodiments, generating the visual animations can include generating hyperlinks that allow a user to navigate from one API function to another API function in consecutive order in accordance with the arrangement. For example, a user can select an arrangement of the API functions as follows: API function "1", API function "10", API function "5", API function "6". The arrangement specifies the order in which the API functions are to be invoked. Generating the visual animations to represent the particular arrangement can include generating hyperlinks that allow a user to navigate from API function "1" to API function "10" to API function "5" and to API function "6" in consecutive order. The hyperlinks can allow the user to navigate from one API function to another by including an embedded hyperlink representing each API function that the user can click on via the GUI in order to navigate from one API function to another API function. Each hyperlink can be associated with each API function, i.e., each hyperlink can reference a location of an API operation within each API specification. In some embodiments, generating the visual animations can include generating one or more GUI elements, such as buttons, images, icons, etc., that represent (e.g., logically and/or graphically) each API function. Each GUI element can be clickable by the user in order to allow the user to navigate from one API function to another API function according to the arrangement.

Figure 3:
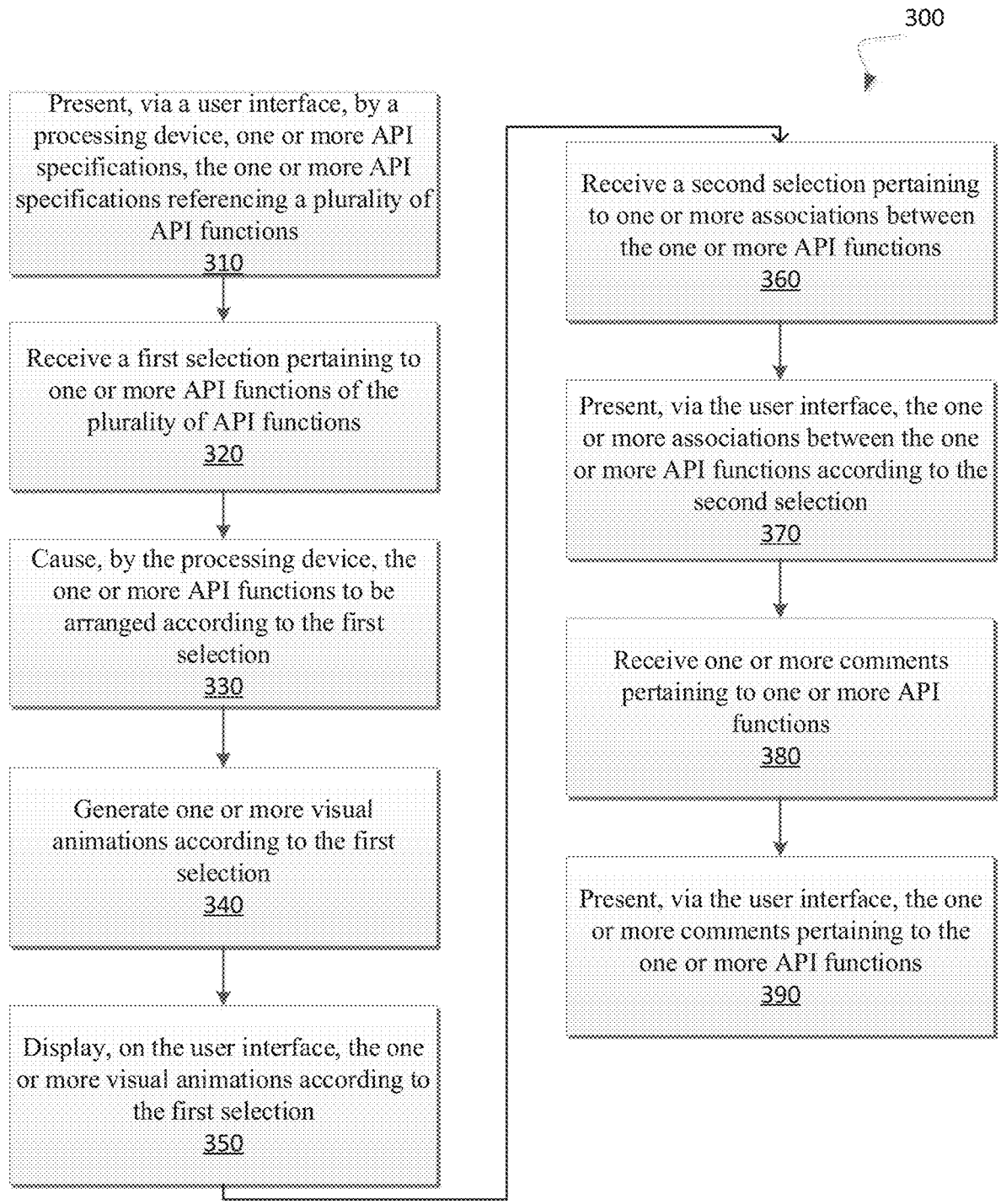
FIG. 3 is a flow diagram of a method for managing a presentation mode for application programming interface functions, in accordance with one or more aspects of the present disclosure.

FIG. 3 depicts a block diagram of a method 300 for providing a presentation mode for application programming interface functions, in accordance with one or more aspects of the present disclosure. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., client devices 130, 131 and/or server devices 110, 112 of FIG. 1) implementing the method. In an illustrative example, method 300 may be performed by a single processing thread. Alternatively, method 300 may be performed by two or more processing threads, each thread implementing one or more individual functions, routines, subroutines, or operations of the method. In an illustrative example, the processing threads implementing method 300 may be synchronized (e.g., using semaphores, critical sections, or other thread synchronization mechanisms).

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, at operation 310, the processing logic the processing logic presents one or more API specifications (e.g., the API specification 136A and/or 136B of FIG. 1) via a user interface (e.g., the user interface 133A and/or 133B of FIG. 1) of a client device (e.g., the client device 130 and/or 131 of FIG. 1). The one or more API specifications can each reference a set of API functions. The one or more API specifications can also define each API function being referenced. The one or more API specifications can also include one or more API resources, one or more input and/or output API parameters, etc., as described herein above. In some embodiments, the processing logic can present the one or more API specifications in response to receiving a request from a user via the client device. In some embodiments, the processing logic can present an API specification repository that includes the one or more API specifications. The API specification repository can be a document that compiles the one or more API specifications within a single document. In some embodiments, each API specification can be an OpenAPI specification document.

At operation 320, the processing logic receives a selection pertaining to one or more API functions. Selecting the one or more API functions can include receiving a selection by a user interacting with a browser (e.g., the browser 135A and/or 135B of FIG. 1) or interacting with a web browser plug-in that is externally extended from the browser. The user can click, enter, or otherwise indicate each API function that the user desires to include, e.g., in a specific flow of API functions in order to perform a certain task and/or achieve a certain goal, as described herein above. For example, if there are API functions 1-5 listed consecutively (i.e., API functions 1, 2, 3, 4, 5) in an API specification, the user can select an order of the API functions to be API function 3, API function 2, API function 1, API function 4, and API function 5. In some embodiments, the one or more API functions can be selected from the set of API functions included in each API specification of the one or more API specifications.

At operation 330, the processing logic causes, by the processing device, the one or more API functions to be arranged according to the selection received at operation 320. In some embodiments, causing the one or more API functions to be arranged according to the selection received can include ordering the one or more API functions in the order specified by the selection. For example, as described with respect to operation 220, the user can select the order of API functions to be API function 3, API function 2, API function 1, API function 4, and API function 5. The processing logic can arrange (i.e., order) the API functions according to the user's specified arrangement.

At operation 340, the processing logic generates one or more visual animations. The one or more visual animations can be generated based on the selection. In some embodiments, generating the visual animations can include generating hyperlinks that allow a user to navigate from one API function to another API function in consecutive order in accordance with the arrangement. For example, a user can select an arrangement of the API functions as follows: API function "1", API function "10", API function "5", API function "6". The arrangement specifies the order in which the API functions are to be invoked. Generating the visual animations to represent the particular arrangement can include generating hyperlinks that allow a user to navigate from API function "1" to API function "10" to API function "5" and to API function "6" in consecutive order. The hyperlinks can allow the user to navigate from one API function to another by including an embedded hyperlink representing each API function that the user can click on via the GUI in order to navigate from one API function to another API function. Each hyperlink can be associated with each API function, i.e., each hyperlink can reference a location of an API operation within each API specification. In some embodiments, generating the visual animations can include generating one or more GUI elements, such as buttons, images, icons, etc., that represent (e.g., logically and/or graphically) each API function. Each GUI element can be clickable by the user in order to allow the user to navigate from one API function to another API function according to the arrangement.

At operation 350, the processing logic displays the one or more visual animation via the user interface. In some embodiments, the visual animations can enable a user to navigate through the selection via the user interface, where the selection represents a specific flow of API functions to be invoked in order to perform a certain task and/or achieve a certain goal (i.e., a particular business outcome).

At operation 360, the processing logic receives another selection pertaining to one or more associations (e.g., relationships) between the one or more API functions selected at operation 320. For example, the selection can pertain to whether an output of one API functions should be used as an input for another (e.g., subsequent) API functions within the selected API functions. For example, the output of an API function A can be used as input of an API function B. In some examples, the outputs of two or more functions (e.g., API function A, API function B, etc.) can be used as input to an API function X. In some examples, the output of an API function A can be used as an input to one or more API functions (e.g., API function B, API function C, etc.) In some examples, the output of an API function A can be used as an input to an API function B, and the output of the API function B can be used as an input to an API function C, etc. In some examples, the output of an API function B can be used as an input of an API function A. In some examples, the output of an API function C and the output of an API function D can be used as inputs of an API function B. In some embodiments, the processing logic can receive the selection from a user via the client device. In some embodiments, receiving the selection from the user can include the user interacting with a browser (e.g., the browser 135A and/or 135B of FIG. 1) via the user interface. Interacting with the browser can include clicking, entering, or otherwise selecting the one or more associations that the user desires to include.

At operation 370, the processing logic presents the one or more associations between the one or more API functions according to the selection via the user interface. In some embodiments, presenting the one or more associations according to the selection includes generating one or more visual animations that are representative of the one or more associations. For example, generating the one or more visual animations representative of the one or more associations can include generating hyperlinks and/or one or more GUI elements (e.g., buttons, images, icons, etc.) for each association. The processing logic can present the one or more visual animations representative of the one or more associations via the user interface.

At operation 380, the processing logic receives one or more comments pertaining to one or more API functions. In some embodiments, the one or more comments can include further information/details, such as details regarding each API function, the specific flow (i.e., the selection of API function), the particular goal/task to be achieved using the specific flow, etc. In some embodiments, the processing logic can receive the one or more comments as a selection from a user via the client device. In some embodiments, receiving the one or more comments from the user can include the user interacting with a browser (e.g., the browser 135A and/or 135B of FIG. 1) via the user interface. Interacting with the browser can include entering or otherwise selecting the one or more comments that the user desires to include.

At operation 390, the processing logic presents the one or more comments pertaining to the one or more API functions via the user interface. In some embodiments, presenting the one or more comments pertaining to the one or more API functions includes generating one or more visual animations that are representative of the one or more comments. For example, generating the one or more visual animations representative of the one or more comments can include generating hyperlinks and/or one or more GUI elements (e.g., buttons, images, icons, etc.) for each comment. The processing logic can present the one or more visual animations representative of the one or more comments via the user interface.

Figure 4:
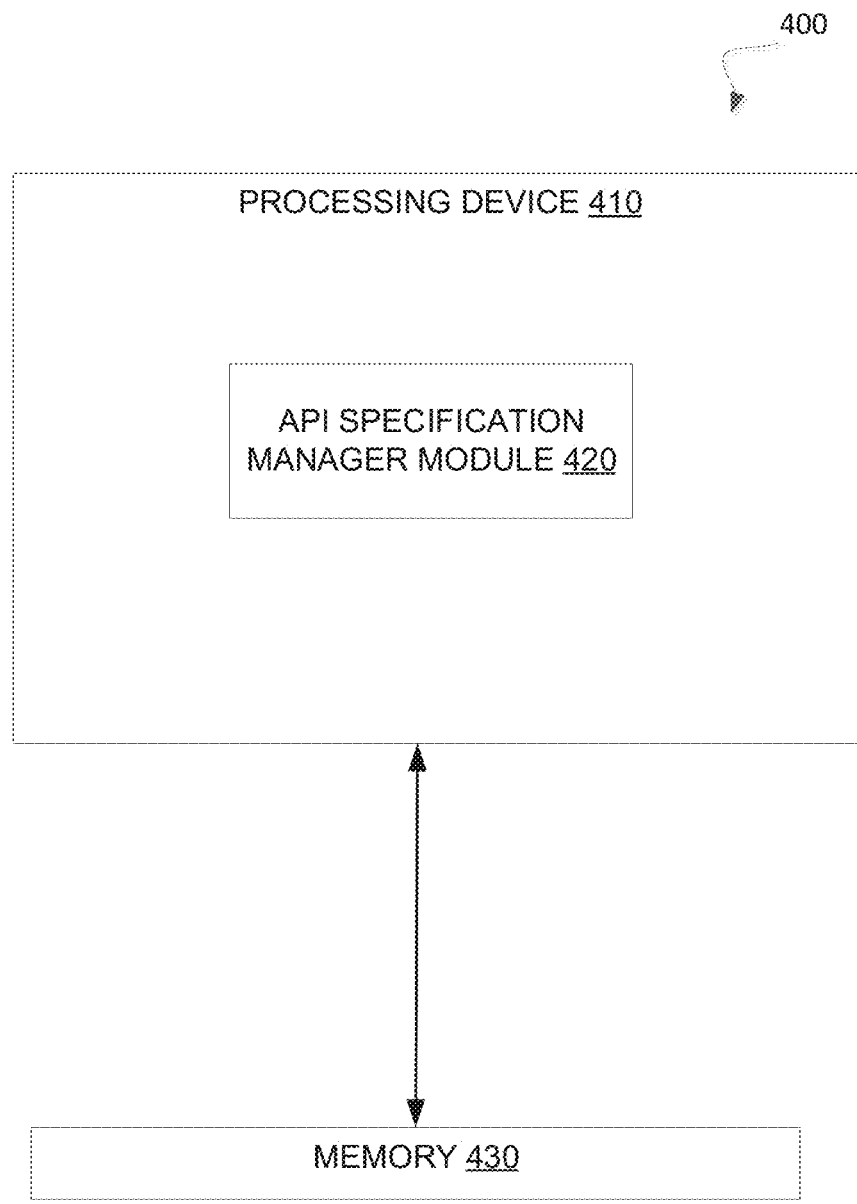
FIG. 4 depicts a block diagram of an illustrative computer system operating in accordance with one or more aspects of the present disclosure.

FIG. 4 is a block diagram example of a computer system 400 operating in accordance with one or more aspects of the present disclosure. Computer system 400 may be the same or similar to the computer system 100 of FIG. 1 and may include one or more processing devices and one or more memory devices. In the example shown, computer system 400 may include an API specification manager module 420 (e.g., the API specification manager 114A and/or 114B of FIG. 1). Alternatively, the functionality of the API specification manager module 420 may be divided into multiple sub-modules.

API specification manager module 420 is responsible for presenting one or more API specifications via a user interface on a client device (e.g., the client devices 130, 131 of FIG. 1). The API specification manager module 420 is also response for receiving a selection pertaining to one or more API functions of a set of API functions that are referenced by each API specification. The selections can be received from a user. The selection can indicate an order of execution of the one or more API functions for perform a particular task and/or achieve a certain goal. API specification manager module 420 can further cause the one or more API functions to be arranged according to the selection received. API specification manager module 420 can further present, via the user interface, the one or more API functions arranged according to the selection. Further details with regard to the API specification manager module 420 is described herein above with reference to FIGS. 1-3.

Figure 5:
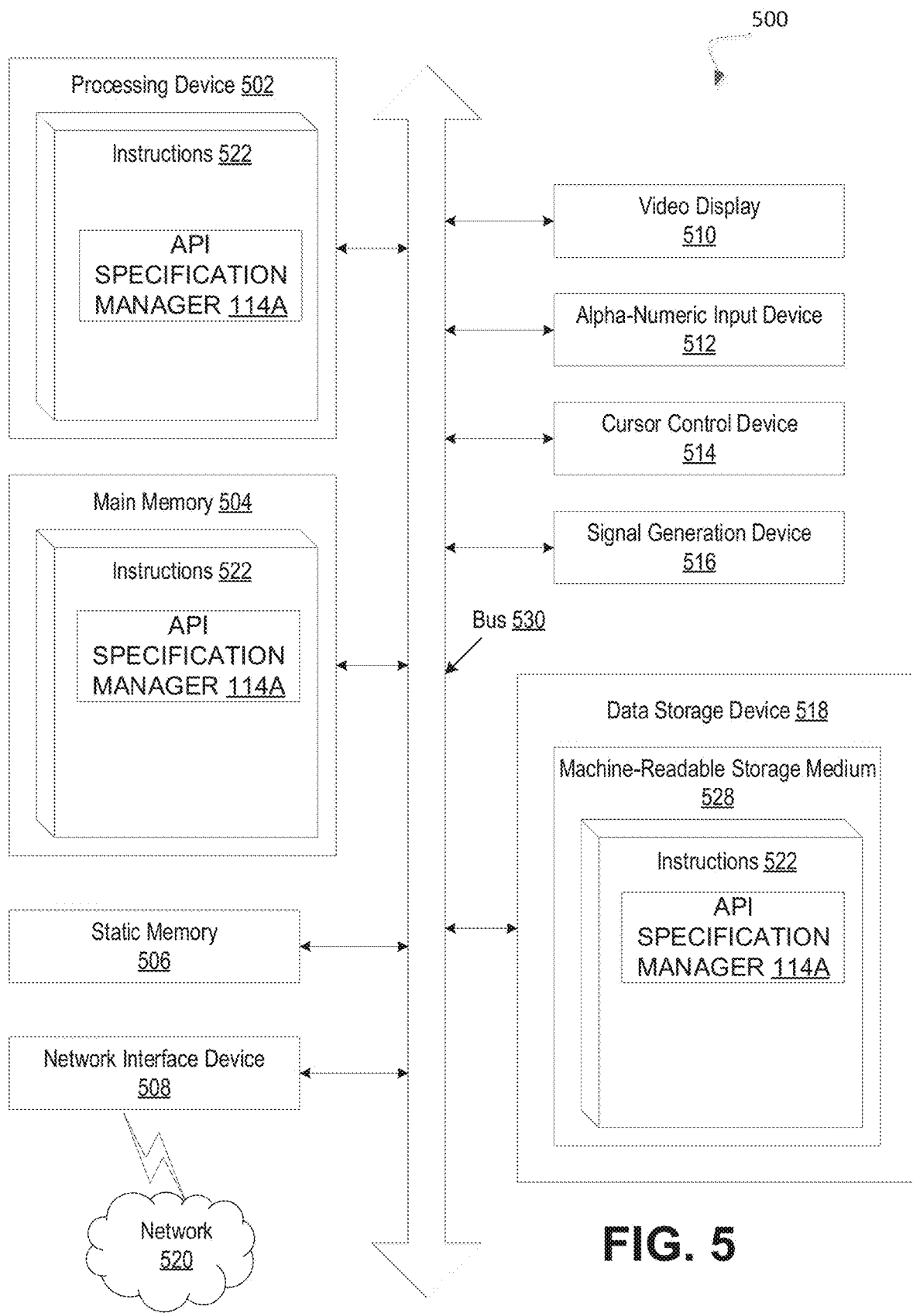
FIG. 5 depicts a block diagram that illustrates one implementation of a computer system in accordance with one or more aspects of the present disclosure.

FIG. 5 is a diagrammatic representation of a machine in the exemplary form of a computer system 500 within which a set of instructions for causing the machine to perform any one or more of the methodologies discussed herein may be executed. In various illustrative examples, computer system 500 may correspond to computer system 100 of FIG. 1.

In certain embodiments, computer system 500 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 500 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 500 may include a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 502 may also be one or more special-purpose processing devices such as an application specific integrated circuit (ASIC), a field programmable gate array (FPGA), a digital signal processor (DSP), network processor, or the like. Processing device 502 may be configured to manage a presentation mode for application programming interface operations as discussed herein.

Computer system 500 may further include a network interface device 508. Computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions 522 embodying any one or more of the methodologies of functions described herein. The instructions 522 may also reside, completely or at least partially, within main memory 504 and/or within processing device 502 during execution thereof by computer system 500; main memory 504 and processing device 502 also constituting machine-readable storage media. The instructions 522 may further be transmitted or received over a network 526 via network interface device 508.

Machine-readable storage medium 528 may also be used to store the device queue manner logic persistently. While machine readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required methods 200 and/or 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:

receiving, via a user interface, by a processing device, a first selection pertaining to one or more API functions of a plurality of API functions, wherein the first selection indicates an order of execution of the one or more API functions for a task;

receiving a second selection indicating a relationship between an output of a first API function and an input of a second API function of the plurality of API functions;

determining the relationship between the output of the first API function and the input of the second API function according to the second selection;

causing, by the processing device, the one or more API functions to be arranged according to the first selection; and presenting, via the user interface, (i) the one or more API functions arranged according to the first selection, and (ii) one or more API specifications, the one or more API specifications referencing the plurality of API functions, wherein the one or more API specifications are hosted by a web browser application, and wherein the first selection is received from a user interacting with a web browser plug-in via the user interface.

2. The method of claim 1, further comprising:
presenting, via the user interface, the relationship between the output of the first API function and the input of the second API function according to the second selection.

3. The method of claim 1, further comprising:
receiving one or more comments pertaining to the one or more API functions of the plurality of API functions; and
presenting, via the user interface, the one or more comments pertaining to the one or more API functions.

4. The method of claim 1, further comprising:
presenting, via the user interface, one or more API specifications, the one or more API specifications referencing the plurality of API functions, wherein the one or more API specifications are hosted by a web browser application, and wherein the first selection is received from a user interacting with the web browser application via the user interface.

5. The method of claim 1, wherein presenting the one or more API functions arranged according to the first selection comprises:
generating one or more visual animations according to the first selection; and
displaying, on the user interface, the one or more visual animations according to the first selection.

6. The method of claim 5, further comprising:
generating one or more hyperlinks associated with each API function of the one or more API functions;
presenting, via the user interface, the one or more hyperlinks; and
in response to receiving a selection of a hyperlink, causing, by the processing device, the user interface to display the API function associated with the hyperlink.

7. A system, comprising:
a memory;
a processing device operatively coupled to the memory, the processing device configured to:
receive, via a user interface, by the processing device, a first selection pertaining to one or more API functions of a plurality of API functions, wherein the first selection indicates an order of execution of the one or more API functions for a task;
receive a second selection indicating a relationship between an output of a first API function and an input of a second API function of the plurality of API functions;
setting the relationship between the output of the first API function and the input of the second API function according to the second selection;
cause, by the processing device, the one or more API functions to be arranged according to the first selection; and
present, via the user interface, (i) the one or more API functions arranged according to the first selection, and (ii) one or more API specifications, the one or more API specifications referencing the plurality of API functions, wherein the one or more API specifications are hosted by a web browser application, and wherein the first selection is received from a user interacting with a web browser plug-in via the user interface.

8. The system of claim 7, further comprising:
presenting, via the user interface, the relationship between the output of the first API function and the input of the second API function according to the second selection.

9. The system of claim 7, further comprising:
receiving one or more comments pertaining to the one or more API functions of the plurality of API functions; and
presenting, via the user interface, the one or more comments pertaining to the one or more API functions.

10. The system of claim 7, further comprising:
presenting, via the user interface, one or more API specifications, the one or more API specifications referencing the plurality of API functions, wherein the one or more API specifications are hosted by a web browser application, and wherein the first selection is received from a user interacting with the web browser application via the user interface.

11. The system of claim 7, wherein presenting the one or more API functions arranged according to the first selection comprises:
generating one or more visual animations according to the first selection; and
displaying, on the user interface, the one or more visual animations according to the first selection.

12. A non-transitory computer-readable storage medium comprising instructions that, when executed by a processing device, cause the processing device to perform operations comprising:
receiving, via a user interface, by the processing device, a first selection pertaining to one or more API functions of a plurality of API functions, wherein the first selection indicates an order of execution of the one or more API functions for a task;
receiving a second selection indicating a relationship between an output of a first API function and an input of a second API function of the plurality of API functions;
setting the relationship between output of the first API function and the input of the second API function according to the second selection;
causing, by the processing device, the one or more API functions to be arranged according to the first selection; and
presenting, via the user interface, (i) the one or more API functions arranged according to the first selection, and (ii) one or more API specifications, the one or more API specifications referencing the plurality of API functions, wherein the one or more API specifications are hosted by a web browser application, and wherein the first selection is received from a user interacting with a web browser plug-in via the user interface.

13. The non-transitory computer-readable storage medium of claim 12, further comprising:
presenting, via the user interface, the relationship between the output of the first API function and the input of the second API function according to the second selection.

14. The non-transitory computer-readable storage medium of claim 12, further comprising:
receiving one or more comments pertaining to the one or more API functions of the plurality of API functions; and
presenting, via the user interface, the one or more comments pertaining to the one or more API functions.

15. The non-transitory computer-readable storage medium of claim 12, further comprising:
presenting, via the user interface, one or more API specifications, the one or more API specifications referencing the plurality of API functions, wherein the one or more API specifications are hosted by a web browser application, and wherein the first selection is received from a user interacting with the web browser application via the user interface.

16. The non-transitory computer-readable storage medium of claim 12, wherein presenting the one or more API functions arranged according to the first selection comprises:
   generating one or more visual animations according to the first selection; and
   displaying, on the user interface, the one or more visual animations according to the first selection.

17. The non-transitory computer-readable storage medium of claim 16, further comprising:
   generating one or more hyperlinks associated with each API function of the one or more API functions;
   presenting, via the user interface, the one or more hyperlinks; and
   in response to receiving a selection of a hyperlink, causing, by the processing device, the user interface to display the API function associated with the hyperlink.

* * * * *